US010536743B2

(12) United States Patent
Matejka et al.

(10) Patent No.: US 10,536,743 B2
(45) Date of Patent: Jan. 14, 2020

(54) PRELOADING AND SWITCHING STREAMING VIDEOS

(71) Applicant: AUTODESK, Inc., San Rafael, CA (US)

(72) Inventors: Justin Frank Matejka, Newmarket (CA); George Fitzmaurice, Toronto (CA); Tovi Grossman, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 0 days.

(21) Appl. No.: 14/730,191

(22) Filed: Jun. 3, 2015

(65) Prior Publication Data
US 2016/0360262 A1    Dec. 8, 2016

(51) Int. Cl.
*H04N 21/433* (2011.01)
*H04N 21/462* (2011.01)
*H04N 21/472* (2011.01)
*H04N 21/437* (2011.01)

(52) U.S. Cl.
CPC ....... *H04N 21/4331* (2013.01); *H04N 21/437* (2013.01); *H04N 21/4622* (2013.01); *H04N 21/47217* (2013.01)

(58) Field of Classification Search
CPC ............. H04N 21/4331; H04N 21/437; H04N 21/4622; H04N 21/47217
USPC ....................................................... 725/100
See application file for complete search history.

(56) References Cited

U.S. PATENT DOCUMENTS

| 8,082,571 B2 * | 12/2011 | Aoki ...................... H04N 5/765 348/14.01 |
| 2006/0034583 A1 * | 2/2006 | Shimizu ................. G09B 5/065 386/353 |
| 2007/0025700 A1 * | 2/2007 | Kim ....................... G11B 27/10 386/259 |
| 2007/0033633 A1 * | 2/2007 | Andrews .......... H04N 21/23418 725/135 |
| 2008/0063369 A1 * | 3/2008 | Kim ....................... G11B 27/10 386/339 |
| 2014/0368734 A1 * | 12/2014 | Hoffert .............. H04N 5/44591 348/564 |
| 2015/0033277 A1 * | 1/2015 | Li ...................... H04N 21/4307 725/116 |
| 2015/0074735 A1 * | 3/2015 | Herigstad ............ H04N 21/478 725/110 |
| 2015/0113407 A1 * | 4/2015 | Hoffert ................. G06F 3/0482 715/720 |

FOREIGN PATENT DOCUMENTS

WO    WO-0126378 A1 *    4/2001    ....... H04N 21/23412

* cited by examiner

*Primary Examiner* — Alfonso Castro
(74) *Attorney, Agent, or Firm* — Artegis Law Group, LLP (57) ABSTRACT

One embodiment of the present invention sets forth a technique for playing sequential video streams. The technique involves initiating playback of a first video stream within a foreground of a display region and loading at least a portion of a second video stream during the playback of the first video stream. The technique further involves detects an event associated with the playback of the first video stream, and, in response, initiating playback of the second video stream within the foreground of the display region.

21 Claims, 6 Drawing Sheets

PRELOADING AND SWITCHING STREAMING VIDEOS

BACKGROUND OF THE INVENTION

Field of the Invention

The present invention generally relates to multimedia playback, and, more specifically, to an approach for preloading and switching streaming videos.

Description of the Related Art

The Internet enables users to access various types of multimedia content, ranging from relatively short video clips to full-length movies. Video streaming is one technique by which multimedia content is presented to a user. Typically, when performing video streaming, a media player executing on a client computer acquires a portion of a video stream and begins playing the video stream before the entire video stream has been received from the content provider. For example, a media player may download the first half of a video clip and begin playing the first half of the video clip while the media player is downloading the second half of the video clip. If the second half of the video clip is downloaded before the first half of the video clip is finished playing, then the media player can continue playing the second half of the video clip without interruption.

Despite advances in computer and Internet technology, various issues continue to cause delays when playing video media. In particular, before playing a video clip that is stored locally on a computer, a small delay may be introduced when the video clip is loaded from a local disk and/or when decoding of the video clip is initiated. Additionally, when viewing a video stream via the Internet, a delay is typically experienced before any video frames are displayed to the user. For example, a certain period of time is typically required for a media player to buffer a sufficient amount of video data before playback can begin. The delay can be considerable when viewing a video stream via a low-bandwidth or high-latency connection. Further, the delays associated with streaming video may be particularly troublesome when a user attempts to view multiple, relatively short video clips in succession.

As the foregoing illustrates, a more effective way for users to view multiple video clips would be useful.

SUMMARY OF THE INVENTION

One embodiment of the present invention sets forth a method for playing sequential video streams. The method involves initiating playback of a first video stream within a foreground of a display region and loading at least a portion of a second video stream during the playback of the first video stream. The method further involves detecting an event associated with the playback of the first video stream, and, in response, initiating playback of the second video stream within the foreground of the display region.

Further embodiments provide a non-transitory computer-readable medium and a computing device to carry out the method set forth above.

Advantageously, the disclosed technique enables a user to view multiple video streams in succession without experiencing a significant delay when switching between video streams. Thus, the disclosed technique, among other things, mitigates or eliminates the effects of low bandwidth and high latency connections by reducing or eliminating delay between multiple video streams played in succession.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
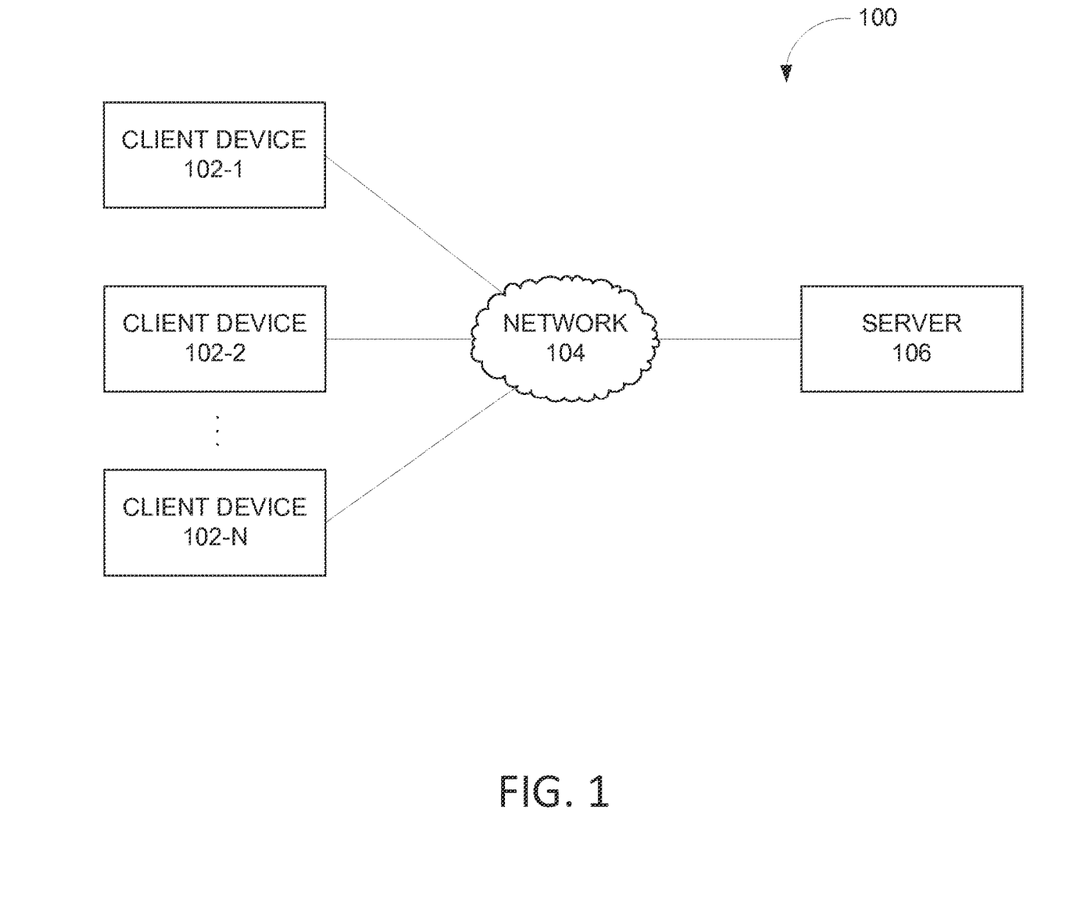
FIG. 1 illustrates a system configured to implement one or more aspects of the present invention.

FIG. 1 illustrates a system 100 configured to implement one or more aspects of the invention. As shown, the system 100 includes, without limitation, one or more client devices 102 configured to receive data through a network 104 from a server 106. More specifically, as discussed in greater detail below in conjunction with FIG. 2, each client device 102 executes at least one media player manager and multiple media players. The media player manager within each client device 102 manages functionality of the media players and coordinates playback of multiple video streams transmitted from the server 106 and received by the client device 102. The multiple video streams may be played sequentially by client device 102.

In various embodiments, a media player manager executing on client device 102-1 may assign a first video stream to a first media player executing on client device 102-1 and a second video stream to a second media player executing on client device 102-1. The media player manager may assign the first media player to a foreground of a display region and assign the second media player to a background of the display region. The first media player of client device 102-1 then loads at least a portion of the first video stream and initiates playback of the first video stream within a foreground of a display region. In addition, the second media player loads at least a portion of the second video stream while the first media player is playing the first video stream.

Next, upon detecting an event associated with the playback of the first video stream, the media player manager assigns the first media player to the background of the display region. For example, the media player manager may detect that playback of first video stream has reached a predetermined point (e.g., the end of the first video stream or another point in the video stream). In some example embodiments, the event may correspond to the media player manager detecting a request to initiate playback of the second video stream, such as by receiving input from a user to begin playing the second video stream. In still other example embodiments, the event may correspond to the media player manager detecting that a threshold amount of time has elapsed since playback of the first video stream began, detecting a change in the content of the first video stream, detecting a change in a topic associated with the first video stream, and/or detecting that a type of content has not been present during playback of the video stream for a threshold amount of time. Thus, in various embodiments, any technically feasible event associated with playback of the first video stream and/or the second video stream may be detected by the media player manager to cause the media player manager to assign the first media player to the background of the display region.

Next, the media player manager assigns the second media player to the foreground of the display region, and causes the second media player to initiate playback of the second video stream within the foreground of the display region. The media player manager may further assign a third video stream to the first media player, which may load at least a portion of the third video stream while the second media player is playing the second video stream. Then, upon detecting an event associated with the playback of the first video stream, the media player manager assigns the second media player to the background of the display region, assigns the first media player to the foreground of the display region, and causes the first media player to initiate playback of the third video stream within the foreground of the display region. Thus, the first media player and the second media player may continue the above process of alternating between sequential video streams by preloading and switching between playback of multiple video streams.

Client device 102 may be any type of electronic device that enables a user to connect to (e.g., via the Internet, a local area network (LAN), an ad hoc network, etc.) and communicate with one or more other users. Exemplary electronic devices include, without limitation, desktop computing devices, portable or hand-held computing devices, laptops, tablets, smartphones, mobile phones, personal digital assistants (PDAs), etc. In one embodiment, at least one client device 102 may be configured to provide the functionality of server 106, thereby eliminating the necessity of a separate and dedicated server 106. In such an embodiment, the different client devices 102 of FIG. 1 may communicate directly with each other, for example, via a peer-to-peer protocol. In another embodiment, server 106 comprises two or more separate servers, each of the servers transmitting one or more video streams to one or more of client devices 102.

Figure 2:
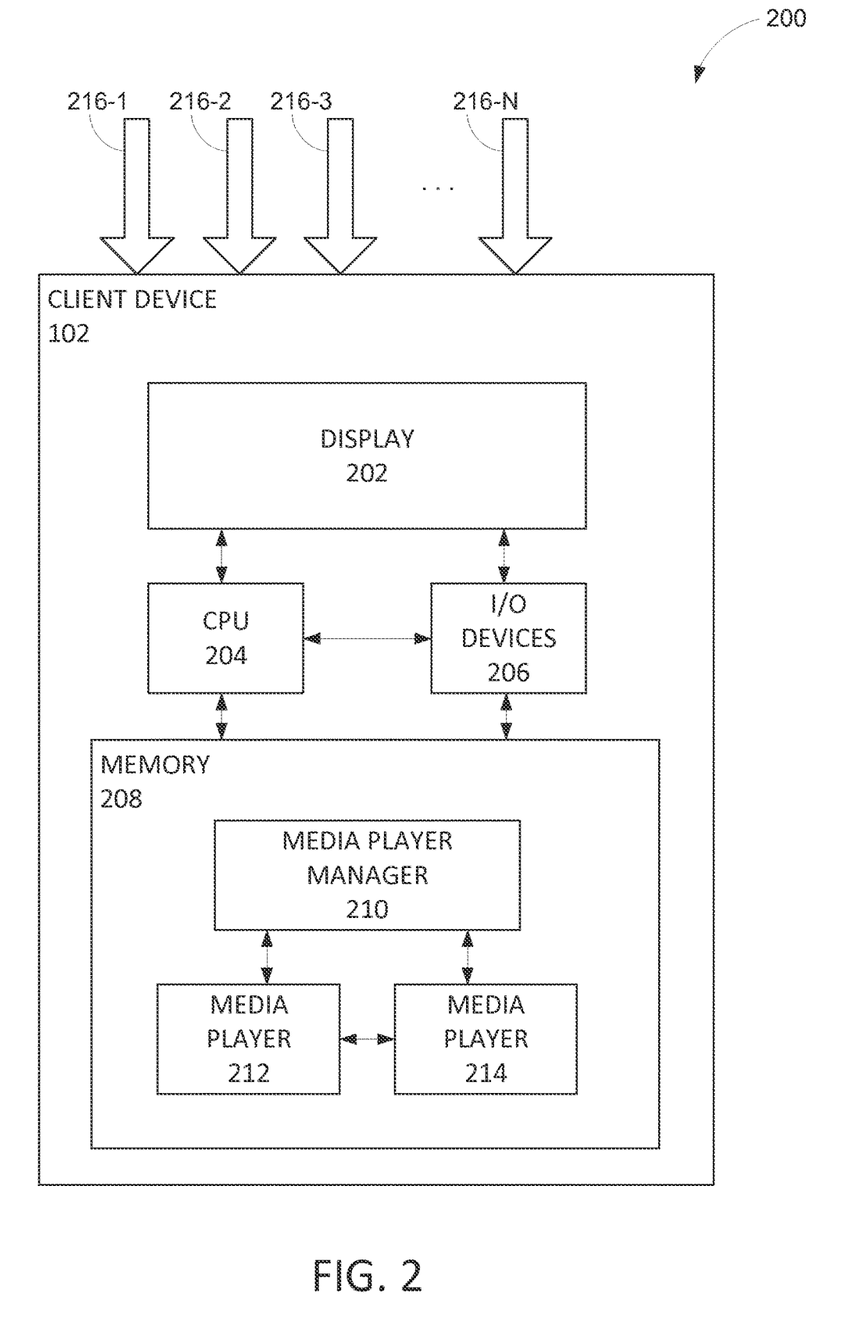
FIG. 2 is a block diagram of a client device that may be implemented in conjunction with the system of FIG. 1, according to various embodiments of the present invention.

FIG. 2 sets forth more detailed illustrations 200 of one of client devices 102 of FIG. 1, according to various embodiments of the present invention. As shown, client device 102 includes, without limitation, a display 202, a central processing unit (CPU) 204, one or more input/output (I/O) devices 206, and a memory 208. Memory 208 is configured to store a media player manager 210, media player 212, and media player 214. CPU 204 is configured to execute media player manager 210, media player 212, and media player 214. Further, client device 102 is configured to receive video streams 216 from one or more sources, such as server 106. Server 106 includes any necessary devices and/or software for generating and transmitting multiple video streams to each of the one or more of client devices 102.

Media player manager 210 may be any type of software application suitable for managing functionality of media players and for coordinating playback of one or more video streams 216 by media player 212 and media player 214. Media player 212 and media player 214 may be any type of software application suitable for loading, decoding, and/or playing video streams 216 and other types of audio and/or video content. In some embodiments, media player 212 and/or media player 214 provide some or all of the functionality of media player manager 210 as described herein. Thus, media player 212 and/or media player 214 may coordinate playback of the multiple video streams 216, for example, by controlling the manner in which video streams 216 and preloaded, played back, and/or switched between a foreground and background of a display region.

In the exemplary embodiment, client device 102 receives video steam 216-1 and video stream 216-2. Media player manager 210 assigns video stream 216-1 to media player 212. Media player 212 then loads at least a portion of video stream 216-1 and initiates playback of video stream 216-1 within the foreground of a display region generated by display 202. The foreground of the display region is a top-most display layer of a graphic user interface of the display region, such that a media player, video stream, or any other graphical object assigned to the foreground of the display region will be displayed while a media player, video stream, or any other graphical object assigned to any other layer of the display region (i.e., a background layer) will not be displayed. In the exemplary embodiment, media player manager 210 assigns media player 212 to the foreground of the display region and assigns media player 214 to the background of the display region. Media player manager 210 also assigns video stream 216-2 to media player 214. Media player 214 then loads at least a portion of video stream 216-2 while media player 212 is playing video stream 216-1. After loading at least the portion of video stream 216-2, media player 214 may initiate playback of at least the portion of video stream 216-2 within the background while media player 212 is playing video stream 216-1.

In response to determining that playback of the video stream 216-1 by media player 212 is complete, the media player manager 210 assigns media player 212 to the background of the display region and assigns media player 214 to the foreground of the display region. In some embodiments, media player 214 is already playing video stream 216-2 when it is assigned to the foreground of the display region. In other embodiments, media player manager 210 causes media player 214 to begin playback of video stream 216-2 in response to assigning media player 214 to the foreground. Media player manager 210 may further assign a third video stream 216-3 to media player 212. Media player 212 then loads at least a portion of video stream 216-3 while media player 214 is playing video stream 216-2. Media player 212 and media player 214 may continue to alternate loading and playback of the video streams 216 in this manner.

In some embodiments, media player manager 210 may manage the functionality of three or more media players and coordinate playback of the video streams 216 among the three or more media players in a similar manner as described above for two media players. For example, memory 208 may include a third media player and media player manager 210 may coordinate loading and playback of the video streams 216 between media player 212, media player 214, and the third media player.

Thus, while one video stream is playing on media player 212, media player 214 and the third media player may be assigned to the background of the display region and one or more of the media players 212 may load a different video stream while in the background of the display region. For example, media player 214 may load video stream 216-2 and the third media player may load video stream 216-3. As described above, media player 214 may begin playing video stream 216-2 in the foreground of the display region. In response to determining that the playback of video stream 216-2 by media player 214 is complete, media player manager 210 assigns media player 214 to the background of the display region, assigns the third media player to the foreground of the display region, and causes the third media player to initiate playback of video stream 216-3 within the foreground of the display region.

Media player 212 and/or media player 214 may each load another video stream while the third media player plays video stream 216-3 within the foreground of the display region. Further, media player manager 210 may manage and coordinate any additional number of media players in a manner similar to that described above.

In one embodiment, media player 214 initiates playback of video stream 216-2 within the background of the display region during the playback of video stream 216-1 by media player 212. Therefore, when the media player manager 210 assigns media player 214 to the foreground of the display region, video stream 216-2 is already playing. This eliminates or reduces the delay associated with requesting and beginning playback of video stream 216-2 when switching the foreground between the display of video stream 216-1 and the display of video stream 216-2.

For example, media player manager 210 may initiate playback of video stream 216-2, such as by requesting video stream 216-2 from the server 106. The delay between the requesting playback of video stream 216-2 and playing video stream 216-2 may be based on a video decoder associated with media player 214. Specifically, media player 214 may require a certain amount of time to load video stream 216-2 and queue playback to a particular start location. Moreover, the delay may be based on low network bandwidth and/or high network latency, both of which may affect transmission speed of video stream 216-2.

Therefore, media player manager 210 may initiate playback of video stream 216-2 a certain amount of time before playback of video stream 216-1 completes in order to prevent delay between playback of video stream 216-1 and playback of video stream 216-2. The media player manager 210 may calculate the amount of time based on one or more factors that may contribute to a delay, such as the factors described above.

In one embodiment, media player manager 210 calculates a playback position at which media player 214 will begin playing video stream 216-2 within the background. The calculated playback position may be based on an amount of time remaining in the first video stream and/or an amount of time before which video stream 216-1 and video stream 2216-2 will be switched. By beginning playback at the calculated playback position, media player 214 will reach a desired location in video stream 216-2 as media player 214 is being switched from the background to the foreground. Accordingly, after viewing video stream 216-1, a user may begin viewing video stream 216-2 from the appropriate location in the stream. While media player 214 is loading or playing video stream 216-2 within the background of the display region, media player manager 210 periodically determines a current playback position of video stream 216-2 and compares the current playback position to the calculated playback position. If the current playback position is different than the calculated playback position, then the playhead position is adjusted to the calculated playback position. Such an adjustment may be necessary due to delays in loading and/or playing video stream 216-2. For example, video decoding, network latency, and decreased bandwidth may cause the current playback position to fall behind and differ from the calculated playhead position. In some embodiments, the calculated playback position may be a particular keyframe of video stream 216-2. Providing a particular keyframe to media player 214 may provide an efficient and accurate method for media player manager 210 to cause media player 214 to begin playing video stream 216-2 within the background at a particular point.

Although FIG. 2 shows the media player manager 210 as a separate software module, it is also contemplated that the media player manager 210 may be integrated into media player 212 and/or media player 214 or offered as a software add-on or plug-in for media player 212 and/or media player 214. When configured as a separate software module, the media player manager 210 may be capable of communicating with and receiving information from a variety of different software applications executing on the client device 102.

Figure 3:
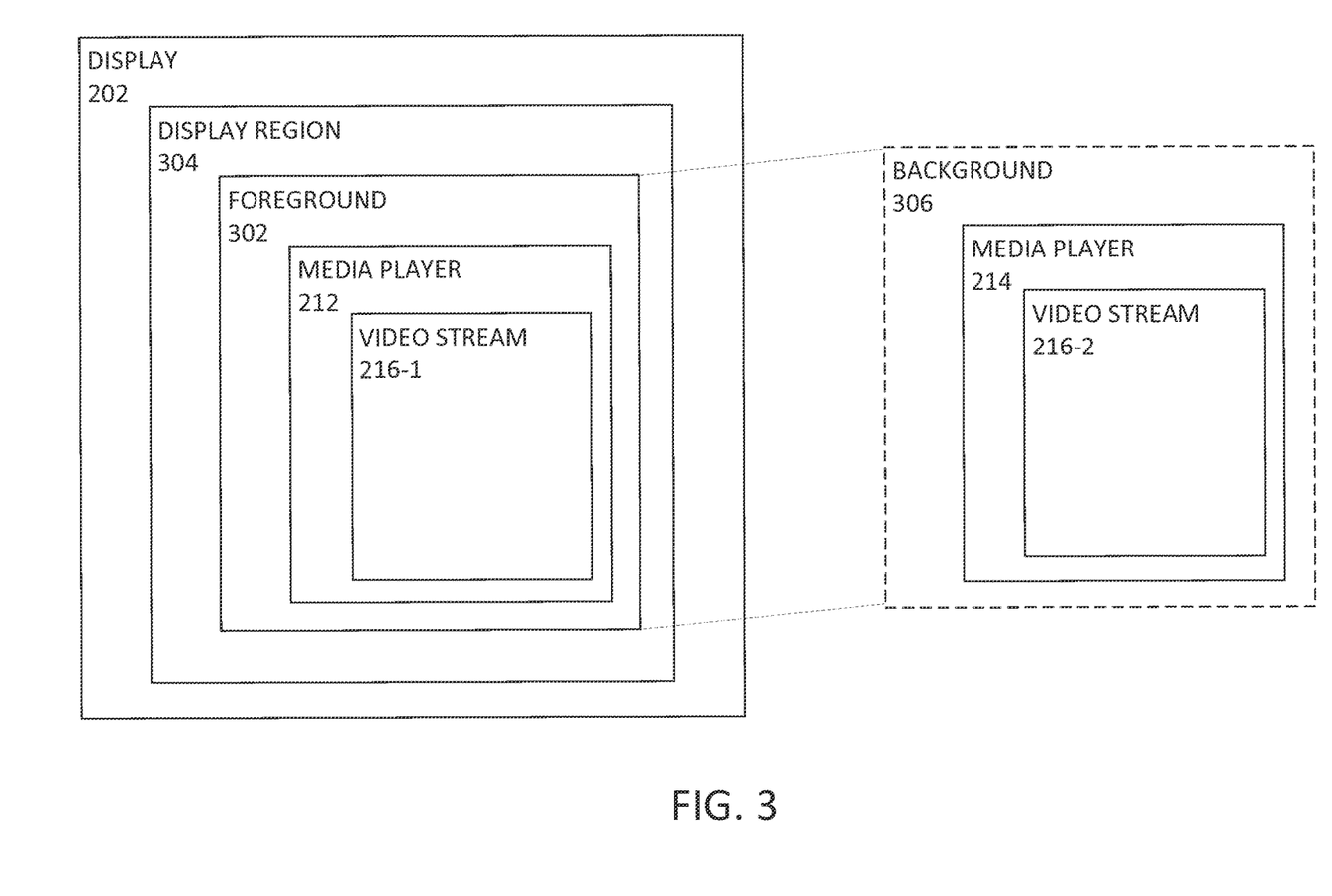
FIG. 3 illustrates a technique for displaying sequential video streams via multiple media players executing on the client device of FIG. 2, according to various embodiments of the present invention.

FIG. 3 illustrates a technique for displaying sequential video streams 216 via multiple media players 212, 214 executing on the client device 102 of FIG. 2, according to various embodiments of the present invention. As shown, a display region 304 generated by the display 202 includes a foreground 302 and a background 306. Media player 212 is assigned to foreground 302 and plays video stream 216-1 within foreground 302. Media player 214 is assigned to background 306 and loads video stream 216-2 within background 306. As discussed above, instead of merely loading video stream 216-2 while media player 214 is assigned to background 306 of display region 304, media player 214 may play video stream 216-2 within background 306.

In various embodiments, the foreground 302 of the display region 304 overlaps the background 306 of the display region 206. Therefore, the background 306 may not be visible on the display 202. Additionally, while a particular media player 212 is assigned to the background 206, audio generated by that media player 212 may not be outputted to a user.

As described above, upon detecting an event associated with the playback of the first video stream 216-1, the media player manager 210 may assign media player 212 to the background 306 and assign media player 214 to the foreground 304. Then, video stream 216-2 will be visible and the output of media player 212 will no longer be displayed to the user.

Although the foreground 302 is described with reference to only a portion of the display region 306, in some embodiments, the foreground 302 corresponds to substantially the entire area of the display region 304. Similarly, although media player 212 is shown within a portion of the foreground 302, in some embodiments, media player 212 is displayed within substantially the entire area of the foreground 302. Furthermore, although video stream 216-1 is shown within a portion of the media player 212, in some embodiments, video stream 216-1 is displayed within substantially the entire display area of media player 212.

Furthermore, in some embodiments, at least a portion of the background 306 may be displayed while the foreground 302 is displayed. For example, the background 306 and the foreground 302 may be displayed concurrently in different areas of the display region, such that the foreground 302 and the background 306 do not overlap. In still other embodiments, the background 306 may be displayed concurrently with the foreground 302 in areas of the display region that partially overlap.

Figure 4:
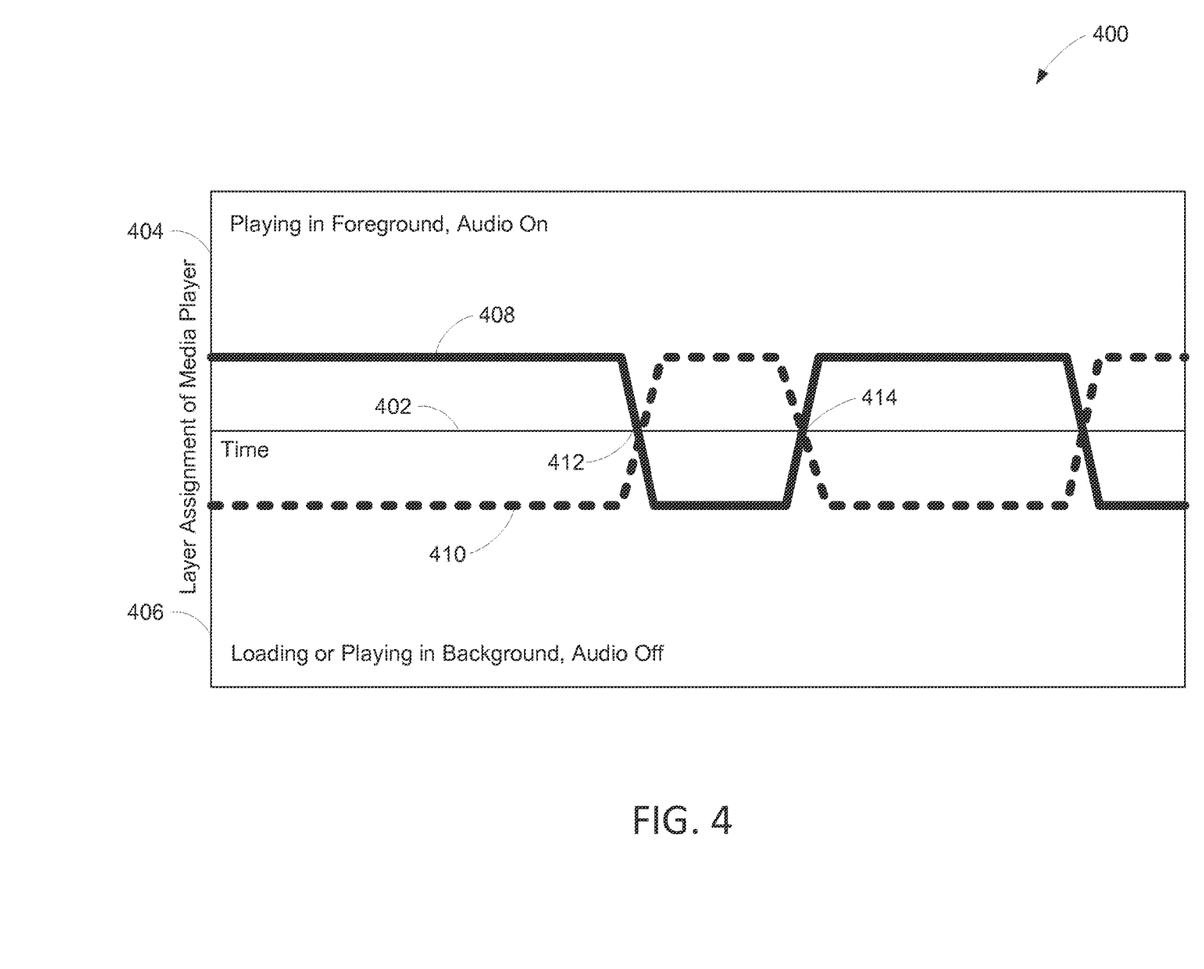
FIG. 4 illustrates a layer to which each of two media players is assigned as a function of time when displaying sequential video streams via the client device of FIG. 2, according to various embodiments of the present invention.

FIG. 4 illustrates a layer to which each of two media players 212, 214 is assigned as a function of time when displaying sequential video streams on the client device 102 of FIG. 2, according to various embodiments of the present invention. As shown, the timeline 402 of the graph 400 represents the progression of time flow from the left to the right. The upper half 404 of the graph is associated with a media player assigned to foreground 302 and playing a video stream in foreground 302. In some embodiments, any audio associated with the video stream playing in the foreground is on or enabled. The lower half 406 of the graph is associated with a media player assigned to background 306 and loading a video stream in background 306 or playing a video stream in background 306. In some embodiments, any audio associated with the video stream playing in the background is off or disabled.

The media player state 408 represents the state of media player 212 and media player state 410 represents the state of media player 214. At the beginning of timeline 402, media player 212 is assigned to foreground 302 and is playing video stream 216-1 within foreground 302 of display region 304 and media player 214 is assigned to background 306 and is loading or playing video stream 216-2 within background 306 of display region 304.

The transition 412 shows the first point along timeline 402 at which media player manager 210 switches media player 212 from foreground 302 to background 306 and switches media player 214 from background 306 to foreground 302. This may occur, for example, in response to the media player manager 210 detecting an event associated with the playback of the first video stream 216-1, as described above. In some embodiments, the entire video stream 216-2 is loaded before media player 214 is assigned to foreground 302 at transition 412.

Prior to transition 412, media player 214 may be playing video stream 216-2 within background 306. Accordingly, the media players 212 may seamlessly switch. Additionally, after transition 412, media player 212 may begin loading a third video stream while media player 212 is assigned to background 306. As shown, the transition of media player 212 to the background 306 and the transition of media player 214 to the foreground 302 may occur at substantially the same time Returning to the progression of timeline 402, transition 414 shows the next point along timeline 402 at which at the media players switch places with respect to foreground 302 and background 306. At transition 414, media player manager 210 assigns media player 214 to background 306 and assigns media player 212 to foreground 302. This may occur, for example, in response to media player 214 completing playback of video stream 216-2, as described above. Media player 212 may then begin playing the third video stream, as discussed above.

Figure 5:
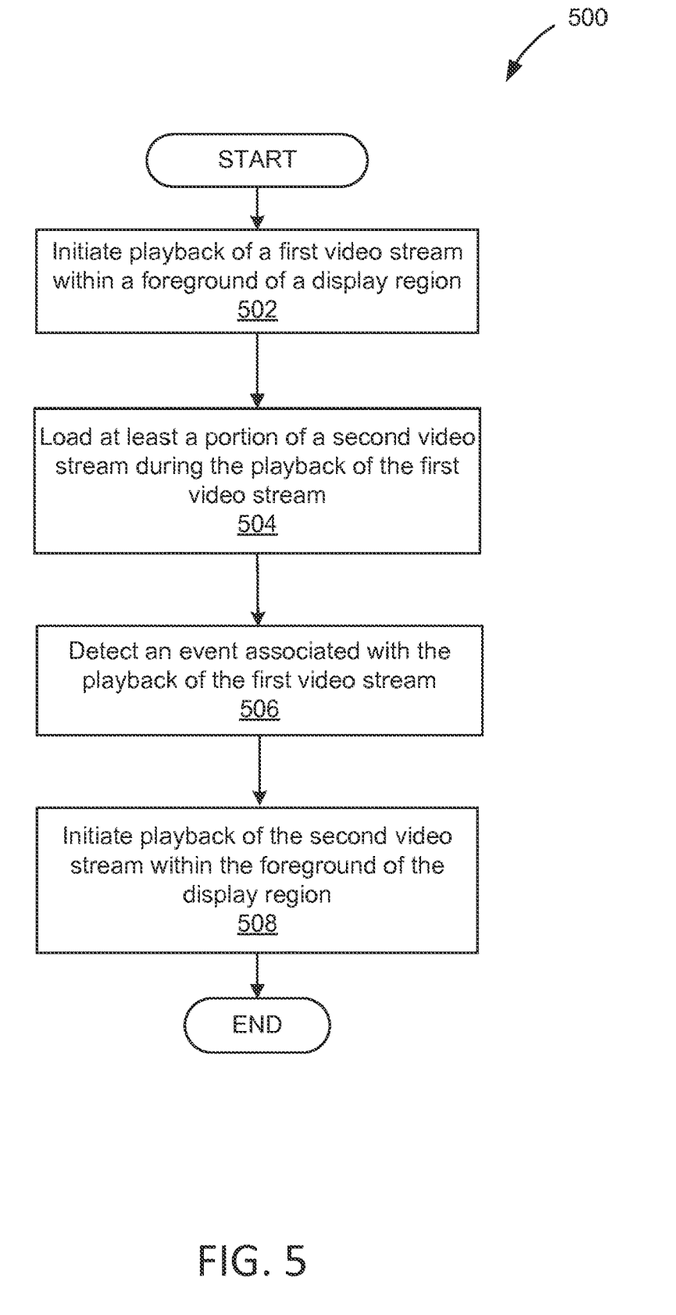
FIG. 5 is a flow diagram of method steps for displaying sequential video streams, according to various embodiments of the present invention.

FIG. 5 is a flow diagram of method steps for displaying sequential video streams, according to various embodiments of the present invention. Although the method steps are described in conjunction with the systems of FIGS. 1-4, persons skilled in the art will understand that any system configured to perform either of the sets of method steps, in any order, falls within the scope of the present invention.

As shown in FIG. 5, a method 500 begins at step 502, where media player manager 210 causes media player 212 to initiate playback of a first video stream within foreground 302 of display region 304. The first video stream may be video stream 216-1. At step 504, media player 214 loads at least a portion of a second video stream during the playback of the first video stream. The second video stream may be video stream 216-2.

At step 506, media player manager 210 detects an event associated with the playback of the first video stream. For example, media player 212 may detect that playback of video stream 216-1 is complete and transmit a signal to media player manager 210. Then, media player manager 210 causes media player 214 to initiate playback of the second video stream within foreground 302 of display region 304 at step 508. For example, media player 214 may initiate playback of video stream 216-2 within foreground 302 of display region 304 by switching media player 214 from background 306 to foreground 302.

Figure 6:
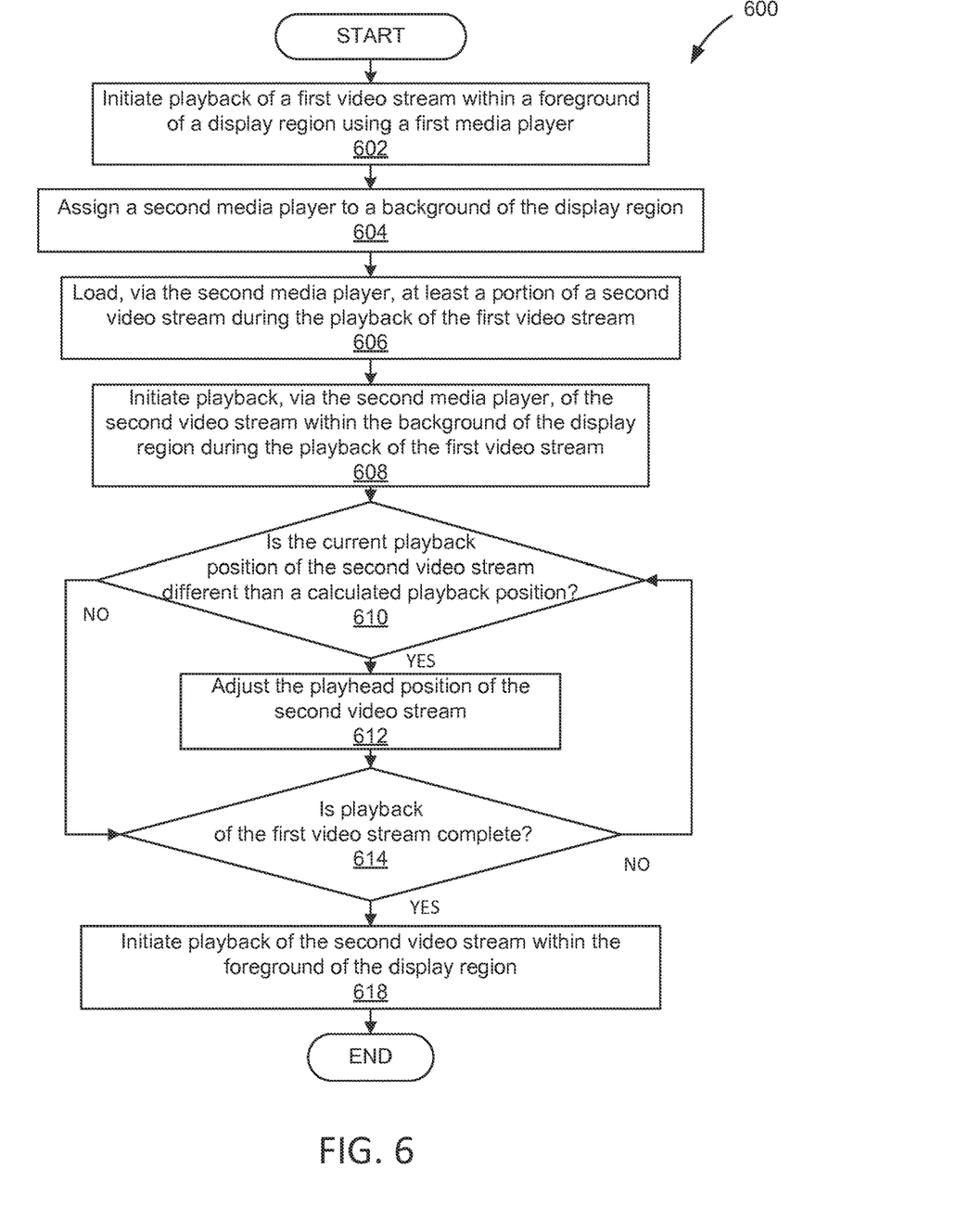
FIG. 6 is a flow diagram of method steps for displaying sequential video streams, according to various embodiments of the present invention.

FIG. 6 is a flow diagram of method steps for displaying sequential video streams, according to various embodiments of the present invention. Although the method steps are described in conjunction with the systems of FIGS. 1-4, persons skilled in the art will understand that any system configured to perform the method steps, in any order, falls within the scope of the present invention.

As shown, a method 600 begins at step 602, where media player manager 210 causes media player 212 to initiate playback of a first video stream within foreground 302 of display region 304. The first video stream may be video stream 216-1. At step 604, media player manager 210 assigns a second media player to background 306 of display region 304. For example, media player manager 210 may assign media player 214 to background 306. At step 606, media player 214 loads at least a portion of a second video stream during playback of the first video stream. The second video stream may be video stream 216-2.

At step 608, media player manager 210 causes media player 214 to initiate playback of video stream 216-2 within the background 306 of display region 304 during playback of video stream 216-1. At step 610, media player manager 210 determines whether the current playback position of video stream 216-2 is different than the calculated playback position. If media player manager 210 determines that the current playback position of video stream 216-2 is different than the calculated playback position, then media player manager 210 causes media player 214 to adjust the playhead position of video stream 216-2 at step 612. The method 600 then proceeds to step 614. If, at step 610, media player manager 210 determines that the current playback position of video stream 216-2 is not different than the calculated playback position, then the method 600 proceeds to step 614. As described above, media player manager 210 may calculate the playback position before causing media player 214 to initiate playback of video stream 216-2 within background 306 of the display region 304.

At step 614, media player manager 210 determines whether the playback of video stream 216-1 is complete, such as by determining that playback of video stream 216-1 has reached a predetermined point. The predetermined point is not necessarily the end of the video stream, but may be any suitable point within the video stream. If playback of video stream 216-1 is complete, then media player manager 210 initiates playback of video stream 216-2 within foreground 302 of display region 304. If the playback of video stream 216-1 is not complete, then method 600 returns to step 610 to determine whether the current playback position of video stream 216-2 is different than the calculated playback position.

In sum, a first media player initiates playback of a first video stream within a foreground of a display region. During the playback of the first video stream, a media player manager causes a second media player to load at least a portion of a second video stream. The media player manager may also cause the second media player to initiate playback of the second video stream a certain amount of time before playback of the first video stream is complete, such as before playback reaches a predetermined point. Upon detecting an event associated with the playback of the first video stream and/or the second video stream, the media player manager assigns the first media player to the background of the display region and assigns the second media player to the foreground of the display region. Additionally, the first media player optionally begins loading a third video stream for subsequent playback.

Advantageously, the disclosed technique enables a user to view multiple video streams in succession without experiencing a significant delay when switching between video streams. Thus, the disclosed technique, among other things, mitigates or eliminates the effects of low bandwidth and high latency connections by reducing or eliminating delay between multiple video streams played in succession One advantage of the techniques described herein is that a series of multiple streaming videos are displayed on a client device with no delay or a reduced delay in between the playback of each of the streaming videos. Delays associated with low network bandwidth, high network latency, and decoding streaming video may be mitigated or eliminated. The elimination of long delays or interruptions in between the playback of each streaming video provides for a smoother transition between videos, leading to a more enjoyable user experience. Furthermore, less time is required to view a series of streaming videos, particularly if many of the streaming videos are of relatively short duration. Therefore, user's time can be more efficiently allocated and computer resources more efficiently utilized.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of media players and video streams, persons skilled in the art will appreciate that the systems and techniques described herein are applicable to other types of software applications, media, and content delivery techniques. The foregoing description and drawings are, accordingly, to be regarded in an illustrative rather than a restrictive sense.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for playing sequential video streams, the method comprising:
   initiating playback of a first video stream within a foreground of a display region;
   performing playback of a second video stream within a non-visible background layer of the display region during the playback of the first video stream;
   comparing a first position the second video stream currently being played back with a calculated keyframe position within the second video stream that is calculated based on an amount of time remaining in the playback of the first video stream;
   in response to determining that the first position within the second video stream currently being played back is different than the calculated keyframe position within the second video stream, adjusting the first position within the second video stream currently being played back to the calculated keyframe position;
   while performing playback of the second video stream, detecting an event based on data associated with the playback of the first video stream; and
   in response, switching playback of the first video stream and the second video stream to replace the first video stream within the foreground of the display region with the second video stream.

2. The method of claim 1, wherein the playback of the first video stream is performed via a first media player and the playback of the second video stream is performed via a second media player.

3. The method of claim 2, wherein the second media player loads at least a portion of the second video stream, and the second media player is assigned to the background layer of the display region during the loading of the at least the portion of the second video stream.

4. The method of claim 3, wherein the first media player is assigned to the background layer of the display region after switching the playback of the first video stream and the second video stream.

5. The method of claim 4, wherein the first media player loads at least a portion of a third video stream during the playback of the second video stream.

6. The method of claim 1, wherein the foreground of the display region comprises a visible foreground layer of the display region.

7. The method of claim 1, wherein determining that the first position within the second video stream currently being played back is different than the calculated keyframe position within the second video stream comprises detecting a delay in loading the second video stream based on at least one of network latency, network bandwidth, and a decoding delay associated with the second video stream.

8. The method of claim 1, wherein detecting the event based on the data associated with the playback of the first video stream comprises detecting that the playback of the first video stream has reached a predetermined point in the first video stream.

9. The method of claim 1, wherein detecting the event based on the data associated with the playback of the first video stream comprises:
   detecting a first type of content being played back within the first video stream;
   detecting that the first type of content being played back within the first video stream has changed; and
   detecting that a threshold amount of time has elapsed since the first video stream changed from displaying the first type of content.

10. The method of claim 1, wherein adjusting the first position within the second video stream currently being played back to the calculated keyframe position comprises changing a playhead position to the calculated keyframe position.

11. One or more non-transitory computer-readable storage media including instructions that, when executed by one or more processors, cause the one or more processors to play sequential video streams, by performing the steps of:
   initiating playback of a first video stream within a foreground of a display region;
   performing playback of a second video stream within a non-visible background layer of the display region during the playback of the first video stream;
   comparing a first position within the second video stream currently being played back with a calculated keyframe position within the second video stream that is calculated based on an amount of time remaining in the playback of the first video stream;
   in response to determining that the first position within the second video stream currently being played back is different than the calculated keyframe position within the second video stream, adjusting the first position within the second video stream currently being played back to the calculated keyframe position;
   while performing playback of the second video stream, detecting an event based on data associated with the playback of the first video stream; and
   in response, switching playback of the first video stream and the second video stream to replace the first video stream within the foreground of the display region with the second video stream.

12. The one or more non-transitory computer-readable storage media of claim 11, wherein the playback of the first video stream is performed via a first media player and the playback of the second video stream is performed via a second media player.

13. The one or more non-transitory computer-readable storage media of claim 12, wherein the second media player loads at least a portion of the second video stream, and the second media player is assigned to the background layer of the display region during the loading of the at least the portion of the second video stream.

14. The one or more non-transitory computer-readable storage media of claim 13, wherein the first media player is assigned to the background layer of the display region after switching the playback of the first video stream and the second video stream.

15. The one or more non-transitory computer-readable storage media of claim 14, wherein the first media player loads at least a portion of a third video stream during the playback of the second video stream.

16. The one or more non-transitory computer-readable storage media of claim 13, wherein detecting the event comprises detecting that the playback of first video stream reaches a predetermined point.

17. The one or more non-transitory computer-readable storage media of claim 11, wherein the foreground of the display region comprises a visible foreground layer of the display region.

18. The one or more non-transitory computer-readable storage media of claim 11, wherein determermining that the first position within the second video stream currently being played back is different than the calculated keyframe position within the second video stream comprises detecting a delay in loading the second video stream based on at least one of network latency, network bandwidth, and a decoding delay associated with the second video stream.

19. The one or more non-transitory computer-readable storage media of claim 11, wherein detecting the event based on the data associated with the playback of the first video stream comprises detecting a topic currently being played back in the first video stream, and detecting that the topic currently being played back in the first video stream has changed.

20. A computing device, comprising:
one or more memories storing a media player manager application; and
one or more processors coupled to the one or more memories, wherein, when executed by the one or more processors, the media player manager application configures the one or more processors to:
initiate playback of a first video stream within a foreground of a display region;
perform playback of a second video stream within a non-visible background layer of the display region during the playback of the first video stream;
compare a first position within the second video stream currently being played back with a calculated keyframe position within the second video stream that is calculated based on an amount of time remaining in the playback of the first video stream;
in response to determining that the first position within the second video stream currently being played back is different than the calculated keyframe position within the second video stream, adjust the first position within the second video stream currently being played back to the calculated keyframe position;
while performing playback of the second video stream, detect an event based on data associated with the playback of the first video stream; and
in response, switch playback of the first video stream and the second video stream to replace the first video stream within the foreground of the display region with the second video stream.

21. The computing device of claim 20, wherein the playback of the first video stream is performed via a first media player and the playback of the second video stream is performed via a second media player.

* * * * *

UNITED STATES PATENT AND TRADEMARK OFFICE
CERTIFICATE OF CORRECTION

PATENT NO. : 10,536,743 B2
APPLICATION NO. : 14/730191
DATED : January 14, 2020
INVENTOR(S) : Justin Frank Matejka, George Fitzmaurice and Tovi Grossman It is certified that error appears in the above-identified patent and that said Letters Patent is hereby corrected as shown below:

In the Claims

Column 11, Claim 1, Line 12, insert --within-- after position;

Column 12, Claim 18, Line 65, delete "determermining" and insert --determining--.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*